(12) United States Patent
Cesareo et al.

(10) Patent No.: US 10,913,666 B2
(45) Date of Patent: Feb. 9, 2021

(54) PROCESS FOR TREATING WATER CONTAINING HYDROCARBONS BY MEANS OF EXPANDED GRAPHITE

(71) Applicant: Directa Plus S.p.A., Lomazzo (IT)

(72) Inventors: Giulio Cesareo, Como (IT); Annalisa Pola, Traona (IT); Laura Giorgia Rizzi, Saronno (IT)

(73) Assignee: Directa Plus S.p.A., Lomazzo (IT)

( * ) Notice: Subject to any disclaimer, the term of this patent is extended or adjusted under 35 U.S.C. 154(b) by 141 days.

(21) Appl. No.: 16/324,831

(22) PCT Filed: Aug. 9, 2017

(86) PCT No.: PCT/EP2017/070247
§ 371 (c)(1),
(2) Date: Feb. 11, 2019

(87) PCT Pub. No.: WO2018/029277
PCT Pub. Date: Feb. 15, 2018

(65) Prior Publication Data
US 2019/0185348 A1 Jun. 20, 2019

(30) Foreign Application Priority Data

Aug. 12, 2016 (IT) .................. 102016000085194

(51) Int. Cl.
*C02F 1/28* (2006.01)
*B01J 20/28* (2006.01)
(Continued)

(52) U.S. Cl.
CPC .......... *C02F 1/283* (2013.01); *B01D 17/0202* (2013.01); *B01J 20/20* (2013.01);
(Continued)

(58) Field of Classification Search
None
See application file for complete search history.

(56) References Cited

U.S. PATENT DOCUMENTS 5,282,975 A * 2/1994 Maryasin ............... B01J 20/20
                                                       210/691
5,788,865 A * 8/1998 Smirnov ............... C02F 1/681
                                                       210/690
(Continued)

FOREIGN PATENT DOCUMENTS

WO    2006022599 A1    3/2006

OTHER PUBLICATIONS

European Patent Office, International Searching Authority, PCT/EP2017/070247 dated Nov. 29, 2017, pp. 1-72.
(Continued)

*Primary Examiner* — Matthew O Savage
(74) *Attorney, Agent, or Firm* — Patterson Intellectual Property Law, P.C.; Gary L. Montle; Ryan D. Levy (57) ABSTRACT

Process for the treatment of water containing low quantities of hydrocarbons (as dispersed or dissolved or emulsified) by means of expanded graphite having an apparent density from 2 to less than 5 g/l, wherein said hydrocarbons are present in a quantity less than or equal to 1 g/l, a specific surface area from 50 to 100 m$^2$/g and a carbon/oxygen ratio (C:O)≥100. The expanded graphite is mixed vigorously for a short time with the water contaminated by hydrocarbons and easily separated at the end of the treatment.

12 Claims, 9 Drawing Sheets

(51) Int. Cl.
  *B01J 20/20* (2006.01)
  *B01D 17/02* (2006.01)
  *C02F 1/00* (2006.01)
  *C02F 101/32* (2006.01)
  *C02F 103/10* (2006.01)

(52) U.S. Cl.
  CPC ... *B01J 20/28011* (2013.01); *B01J 20/28059* (2013.01); *C02F 1/001* (2013.01); *C02F 2101/32* (2013.01); *C02F 2103/10* (2013.01); *C02F 2303/18* (2013.01)

(56) References Cited

U.S. PATENT DOCUMENTS

| | | | |
|---|---|---|---|
| 7,276,167 B2 * | 10/2007 | Mima | B01D 61/16 210/663 |
| 8,877,050 B2 * | 11/2014 | Martin | C02F 1/285 210/198.1 |
| 2003/0024884 A1 | 2/2003 | Petrik | |

OTHER PUBLICATIONS

Kenji Takeuchi et al.: "Oil sorption by exfoliated graphite from dilute oil-water emulsion for practical applications in produced water treatments", Journal of Water Process Engineering, vol. 8, Sep. 27, 2015, pp. 91-98, XP055371016, ISSN: 214-7144, DOI: 10.1016/j.jwpe.2015.09.002 cited in the application chapters 2 and 3; figures 3-6; tables 1, 2.

Toyoda M et al.: "Sorption and recovery of heavy oils by using exfoliated graphite Part I: Maximum sorption capacity", Desalination, Elsevier, Amsterdam, NL, vol. 128, No. 3, May 1, 2000, pp. 205-211, XP004204826, ISSN: 0011-0164, DOI: 10.1016/S0011-9164 (00) 00034-5 chapters 2 and 3; figures 3, 4, 6, 7; table 1.

Inagaki M et al: "Sorption and recovery of heavy oils by using exfoliated graphite Part III: Trials for practical applicatons", Desalination, Elsevier, Amsterdam, NL, vol. 128, No. 3, May 1, 2000, pp. 219-222, XP004204828, ISSN: 0011-9164, DOI: 10.1016/S0011-9164 (00) 00036-9, the whole document.

\* cited by examiner

PROCESS FOR TREATING WATER CONTAINING HYDROCARBONS BY MEANS OF EXPANDED GRAPHITE

The present invention refers to a process for treating water containing hydrocarbons by means of expanded graphite. More specifically, the invention refers to a process for treating water containing hydrocarbons dispersed, dissolved or emulsified, by means of expanded graphite, in which the water to be treated contains a quantity of hydrocarbons equal to or less than 1 g/l. Various processes are known for treating water, both freshwater and saltwater, contaminated by various types of hydrocarbons, both light and heavy, such as petrol, crude oil, kerosene, fuels, lubricating and engine oils, both natural and synthetic, and similar. Examples of said water are water from petroleum extraction wells (produced water) and water used in many industrial processes which contaminate it with hydrocarbons.

The known processes include both biological processes and chemical and physical processes, and also combinations of said processes. The chemical/physical processes are effective and require relatively short treatment times compared to the biological treatments, the drawback of which are the very long treatment times, but also limited efficiency and high production of sludge.

In the treatment of produced water, chemical/physical processes are therefore preferred, but they have the drawback of very high costs. Furthermore, the use of chemical reagents has a negative effect, representing a source of secondary contamination.

Expanded graphite is a material that has been known for decades due to its oil-absorbing properties.

Recent studies suggest that expanded graphite can effectively adsorb different types of hydrocarbons, but the majority of said studies focus on removal from the water of high concentrations of floating hydrocarbons, usually above 1 g/l. These studies are mainly directed at solving the problem of spillage of petroleum or other hydrocarbons due to accidents, whereas there are very few studies relating to a more targeted decontamination of hydrocarbons from water, i.e. the treatment of water that contains low quantities of dispersed or emulsified or dissolved hydrocarbons, but is nevertheless contaminated.

Wang N. et al; "Adsorption of soluble oil from water to graphene"; Environ. Sci. Pollut. Res.; Springer; Published online 14 Feb. 2014, describe methods for removing soluble oil from water. The study reports the use of graphene prepared by means of oxidation and thermal reduction and attainment of adsorption equilibrium in 30 minutes.

Takeuchi K. et al; "Oil sorption by exfoliated graphite from dilute oil-water emulsion for practical applications in produced water treatments"; Journal of Water Process Engineering; 8 (2015) 91-98, describe the use of exfoliated graphite (EG) for treating emulsions of engine oil and water. The use of various types of EG is described, including oxidised graphite, all having a specific surface area of less than 50 $m^2/g$ and an apparent density of equal to or greater than 5 g/l. The EG prepared by oxidation treatment in air adsorbed the oil rapidly compared to the non-treated EG and reduced the concentration of oil to one fifth of the initial concentration after 20 minutes (p. 94, left-hand column, FIG. 3). The data reported show that the initial concentrations of oil of 100 mg/l were reduced to approximately 15-10 mg/l after 5 minutes of stirring, and that a residual concentration of approximately 5 mg/l was obtained only after 20-30 minutes of stirring (FIG. 3).

The above-mentioned treatments, although effective, again require relatively long times for obtaining stringent abatement of the contaminants, and are therefore not optimal for industrial use. When treating large amounts of polluted water, treatment time is a key factor for the practical applicability of the process.

The object of the present invention is therefore to provide a process for treating water containing dispersed or emulsified or dissolved hydrocarbons by means of expanded graphite, wherein said hydrocarbons are present in amount of less than or equal to 1 g/l, comprising the following steps:
a) mixing said expanded graphite with said water containing hydrocarbons in a vessel, whereby said hydrocarbons are adsorbed by said expanded graphite,
b) allowing said expanded graphite containing said adsorbed hydrocarbons to separate from said water and form a layer of expanded graphite on the top of said water, said water containing residues of said graphite;
c) discharging said water containing residues of said graphite from said vessel; characterized in that:
i) said expanded graphite has an apparent density from 2 to less than 5 g/l, measured with the method defined in the description, a specific surface area from 50 to 100 $m^2/g$, measured with the BET method, and a carbon:oxygen ratio (C:O)≥100, measured with the method defined in the description;
ii) said expanded graphite is used in a weight ratio of up to 1:30 with respect to said hydrocarbons;
iii) said step a) of mixing said expanded graphite in said vessel is carried out by stirring means mounted in said vessel and rotating at a speed of more than 800 rpm;
iv) said step c) of discharging said water containing residues of said graphite from said vessel is carried out by withdrawing said water from a zone below said layer of graphite and passing it through a filtering system, whereby said residues of graphite are removed from said water.

The apparent density of the expanded graphite is measured with the following method: A graduated plastic cylinder with capacity of 800 ml is measured with an electronic weighing scale. The cylinder is filled completely with the expanded graphite, removing any excess with a spatula. The cylinder is removed from the scale and the graphite is compacted by banging the bottom of the cylinder on a hard surface three times, forming an empty space at the top of the cylinder. This space is filled with more expanded graphite, removing any excess with a spatula. The filled cylinder is then weighed. The apparent density is determined via the ratio Sample Weight [g]/Sample Volume [0.8 l]. The result is expressed in g/l.

According to a preferred aspect of the invention, the process is carried out with expanded graphite having a specific surface area (SSA) of 60 to 80 $m^2/g$.

According to a preferred embodiment of the invention, the process is carried out with an expanded graphite having a carbon/oxygen (C:O) ratio ≥200.

The expanded graphite is used in a weight ratio of up to 1:30 with respect to said hydrocarbons. This means that the expanded graphite can adsorb an amount of hydrocarbons up to 30 times the weight of the graphite.

According to a preferred embodiment of the invention, the process is carried out with an expanded graphite in a weight ratio of up to 1:20 with respect to said hydrocarbons. This lower weight ratio ensures that all the are effectively adsorbed by the graphite.

According to a preferred embodiment of the invention, the process is carried out by mixing said expanded graphite and said water with a rotating stirring means at a speed higher than 1000 r.p.m.

In the process according to the invention an expanded graphite is used with a C/O ratio ≥100, preferably ≥200. This ratio is important as it defines the maximum quantity of oxygen bound to the carbon constituting the graphite, i.e. graphite oxide. In fact, it has been found that the best adsorbent properties relative to the hydrocarbons are obtained when the quantity of graphite oxide is minimum. In fact, the polar character of the graphite oxide makes it more hydrophilic and therefore with the tendency to form aqueous dispersions. On the other hand, the graphite with a high C/O ratio is more hydrophobic and lipophilic, therefore when the mixing step is completed, it has been found that it separates from the water more effectively. This favours removal of the graphite containing the hydrocarbon adsorbed.

The C/O ratio in the graphite is measured by elemental analysis carried out by Elemental analyzer (CHNS/O), which provides the percentage by weight of the various elements. By normalizing the values obtained with respect to the atomic weight of the species C and O and deriving their ratio, the C/O ratio is obtained.

The expanded graphite having the characteristics adapted for use in the process according to the invention is marketed by Directa Plus SpA under the trade mark Grafysorber®.

Said graphite is produced with a process that uses intercalated graphite, which can be prepared with methods known to a person skilled in the art or purchased on the market. The intercalated graphite then undergoes an expansion phase performed by subjecting intercalated graphite flakes having a lateral dimension ≤500 μm to a temperature of between 1300 and 12000° C. for less than 2 seconds. Said treatment is carried out as described in the patent EP 2038209 B1, i.e. by generating heat in the GICs (Graphite Intercalation Compounds) preferably by means of an electric arc, a microwave oven or high frequency induction oven or oven for the formation of plasma. The latter treatment is particularly preferred due to the possibility of reaching the desired temperature associated with a high turbulence.

The expanded graphite is mixed with the water contaminated by hydrocarbons in a suitable vessel with suitable agitation means. Preferably a rotating agitation means is used with a rotation speed higher than 1000 r.p.m., to ensure good contact between the graphite particles and the drops or the layer of hydrocarbon present in the water.

An agitated vessel is composed essentially of a cylindrical container, if necessary provided with lid, inside which a stirrer or impeller is arranged, generally in an axial position. On the walls of the agitated vessel, baffles can be arranged, which have the purpose of preventing the formation of deep vortices and the creation of a rigid body motion of the liquid which would obstruct a condition of perfect mixing.

Agitated vessels can also be provided with axial flow or radial flow agitators. The mixture can be moved by the agitator in a mainly axial direction, i.e. along the rotation axis of the shaft, or in a mainly radial direction, i.e. perpendicular to the rotation axis of the shaft. The flow direction, axial or radial, depends on the geometry of the impeller used.

The predominantly axial flow agitators comprise the inclined flat blade impellers, designed to maximize the flow moved and impart minimum shear stress.

The predominantly radial flow agitators comprise the Rushton impellers, bar agitators and disc agitators, designed to maximize the shear stress imparted by the impeller to the mixture, and therefore the local turbulence, whereas the flow moved is minimum.

In addition to the geometry of the impeller, also the height of the impeller from the bottom of the agitated vessel affects the type of flow. For example, positioning a Rushton impeller very near the bottom of the tank results in a predominantly axial flow.

Axial type impellers are preferred for solid-liquid dispersions and when maximization of the rigid body motion is desired. Radial type impellers are preferred when it is necessary to break down a phase interface, for example immiscible liquids, where high shear stress is necessary. According to the type and volumes of water contaminated by hydrocarbons to be treated, a person skilled in the art is able to choose the type of agitated vessel and the agitation means to use.

The mixture of water and expanded graphite formed during the mixing step is then allowed to decant, so that the expanded graphite containing the hydrocarbons separates from the water and forms a layer on the top of the water phase. The water, however, may still contain some residues of small graphite particles that have not reached the surface of the water phase, and which may contain some hydrocarbons.

It is therefore possible to separate the graphite from the water using physical methods such as filtering or centrifuging, or by drawing the clarified water from below the layer of graphite/hydrocarbon.

According to an aspect of the present invention, the water phase separated from the graphite is discharged from the vessel by withdrawing it from a zone below the layer of graphite, and is passed through a filtering system, whereby said residues of graphite are removed from said water.

The filtering system is located at the bottom of the vessel or outside the vessel.

Discharging of the water phase is carried out by gravity or by pumping means. Discharging by using pumping means is preferred.

If the filtering system is located at the bottom of the vessel, it preferably comprises a grid under which a filtering means is housed. A discharging port is provided on the bottom of the vessel, downstream the filtering system. The pumping means is located outside the vessel and downstream said filtering system.

If the filtering system is located outside the vessel, a discharge pipe transfers the water from the vessel to the filtering system. In this case the pumping means is also located outside the vessel, preferably upstream the filtering system.

The filtering means is any suitable filtering means, as known to a skilled person.

The process of the invention for treatment of water containing hydrocarbons is usually carried out at ambient temperature, but it can be applied over a fairly broad ambient temperature range, both in environments with temperate climate and in environments with hot or cold climate. This temperature range can vary between 5 and 40° C., preferably between 10 and 30° C.

Surprisingly, it has been found that the use of expanded graphite according to the invention allows a significant reduction in the treatment time and attainment of an adsorption of a maximum quantity of hydrocarbons in less than 30 minutes, even less than 20 minutes and even less than 10 minutes. In the majority of cases the mixing treatment and contact between expanded graphite and contaminated water can be reduced even further, for example to approximately 5 minutes. This result is confirmed also when using a graphite:hydrocarbon weight ratio equal to or less than 1, i.e. using a quantity of graphite less than the quantity of hydrocarbon present in the water.

It has been found that the process according to the invention can be used to treat water contaminated also by reduced quantities of hydrocarbons, for example containing less than 0.5 g/l of hydrocarbons, or even less than 0.3 g/l of hydrocarbons, resulting equally effective both in terms of capacity to bring the residual hydrocarbon content to a level equal to or below the limit of 5 mg/l established by Italian law for surface water discharge, and in terms of the short duration of the mixing phase, which as a rule does not exceed 5 minutes.

It has also been found that the process of the invention can be repeated by re-using the same expanded graphite to treat new contaminated water for several cycles, and up to 60 cycles.

The invention will now be described by means of some exemplifying embodiments and with reference to the accompanying figures, in which:

With reference to FIGS. 15 and 16, the process of to the invention is described as carried with equipment suitable for use on an industrial scale.

Figure 15:
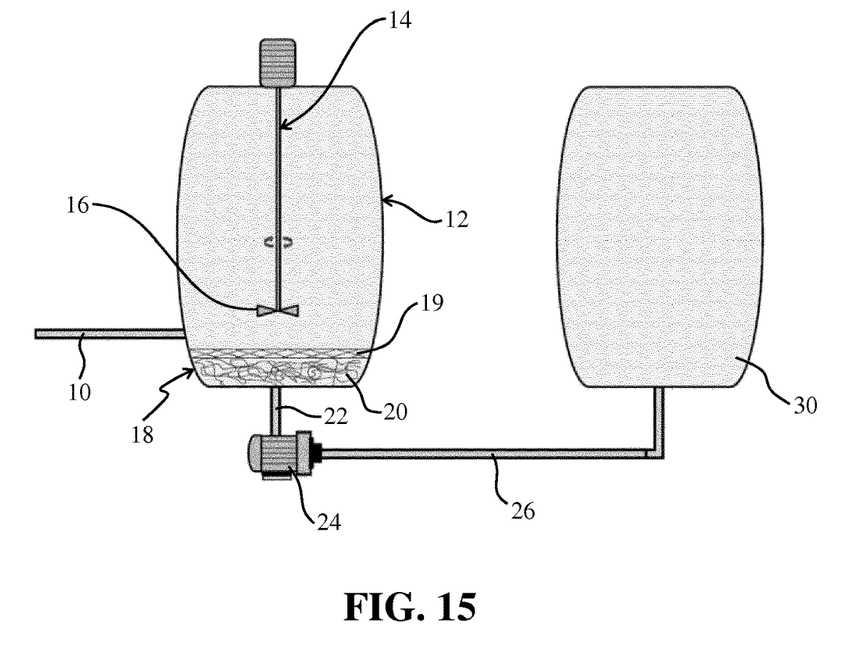
FIG. 15 is a simplified scheme of the process according to the invention, with a filtering system inside the treatment vessel.

With reference to FIG. 15, a pipe 10 brings the contaminated water to be treated in a treatment vessel 12, provided with stirring means 14. Vessel 12 is a cylindrical container, if necessary provided with lid, inside which a stirrer or impeller 14 is arranged in an axial position. Impeller 14 is provided with blade 16.

A filtering system 18 is housed on the bottom of the vessel 1419 and a filtering means 20.

A discharge pipe 22, connected to a discharge port not shown, connects vessel 12 to a pump 24 which causes the liquid inside the vessel to pass through the filter 20, be drawn from the vessel and transferred via transfer line 26 to a tank 30 for storage and consequent discharge of treated water.

Figure 16:
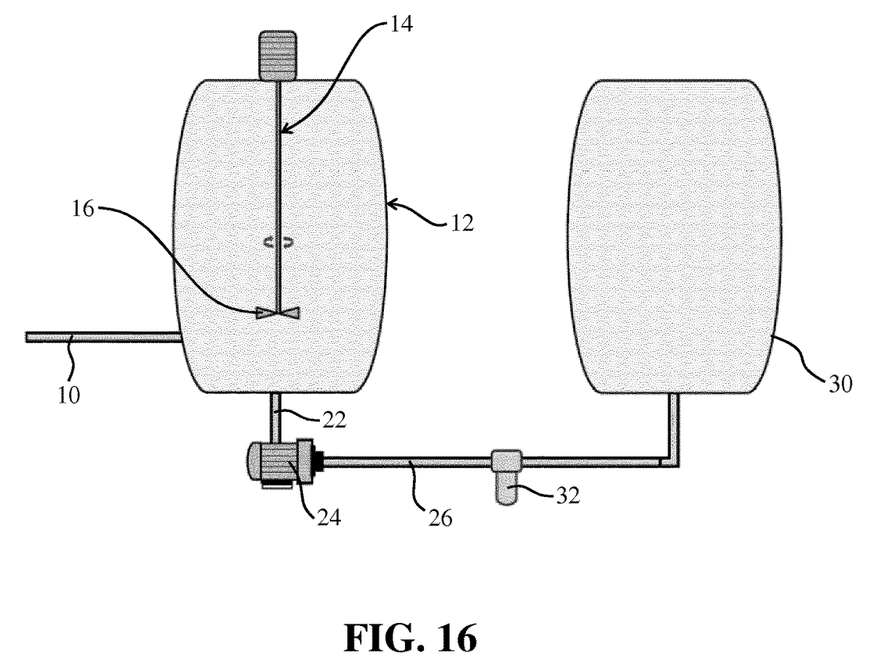
FIG. 16 is a simplified scheme of the process according to the invention, with a filtering system outside the treatment vessel.

FIG. 16 shows a process scheme similar to that of FIG. 15 with the difference that a filtering unit 32 is located outside the vessel 12. The other components are the same and bear the same reference numbers.

Figure 17:
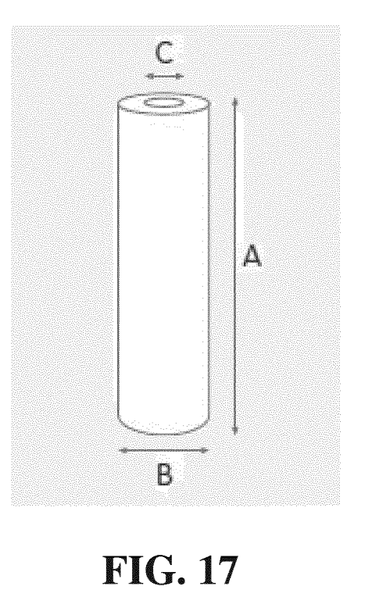
FIG. 17 is a schematic view of a filter for use in the process of the invention.

In a preferred embodiment, in case of external filtering unit, as in FIG. 16, a preferred filter is a polypropylene filtering cartridge, filtration rate of 10 μm. For example, ATLAS 10", 10 micron; Maximum operating pressure: 3.5 bar; Maximum operating temperature: 80° C. A filtering cartridge of this type is shown in FIG. 17, wherein the Height (A): 10" inches, corresponding to 25.2 cm; the External Diameter (B): 6.3 cm; Inner Diameter (C): 2.7 cm; Optimal flow rate: 4.9 l/min.

In a preferred embodiment, in case of internal filtering unit, the inner filter consists of a stainless steel grid 19 located at the bottom of the tank, which has the following technical characteristics (mesh 274, wire diameter 0.04 mm, mesh light 0.053, void percentage 32.8%, weight 0.216 kg/m$^2$). A nonwoven polyester fabric can be placed below grid 19. It has the following characteristics: weight 90 g/m$^2$; Thickness 0.45 mm, average filtration rate of 5 microns. Alternatively, one can use a polyester felt, 2.3 cm thick, weight 300 g/m$^2$. The equipment described above is used to perform a process for treating water containing low amounts of hydrocarbons, either floating on the surface (supernatant phase) or dispersed in the water (emulsified phase) comprising 3 steps:

a) Mixing step.

Mixing may include different treatment programs depending on the concentration of hydrocarbons and the presence or absence of emulsion. Basically, the treatment program can be a continuous cycle from 5 to 20 min, or alternating cycle by phase-to-phase mixing steps (5 min agitation and 5 min stop for a total of 40 min treatment). The continuous cycle is preferred for adsorption of non-emulsified hydrocarbons, while the alternate treatment is preferred for treating oily emulsions. Decantation step.

The decanting step is important to promote the return to the surface of all adsorbent material. This step may vary from 5 to 15 min. It has been found that use of the expanded graphite according to the invention combined with a stirring of not less than 800 rpm, brings about a deposit of less than 1% of adsorbent material, namely of expanded graphite, at the bottom of the treatment vessel at each treatment cycle.

b) Draining and filtration step.

In this last step, the treated water is discharged from the bottom of the tank through a pump with a maximum prevalence of 45 m and a flow rate of 300 l/h. The pump forces the water to pass through a filtering system, thus ensuring the final removal of suspended graphite particles. The filtering system can be inside the vessel for the treatment of water (FIG. 15) or outside the vessel for the treatment of water (FIG. 16). The filtration can be carried out through a cylindrical cartridge filter, preferably of polypropylene with a porosity of preferably 10 microns. Filtering can also be carried out by using a sponge-like filtering medium or fibrous filtering medium in synthetic resin. The filters can be cleaned by injecting water into the backflow.

The process is now described with reference to the following non-limiting examples.

EXAMPLE 1

Treatment of Water Containing 100 ppm of Diesel Fuel with 100 mg/l of Expanded Graphite
Graphite:Hydrocarbon Weight Ratio 1:1
Preparation of the Sample 1000 ml of deionized water are contaminated with 100 mg/l of diesel fuel (density at 15° C. 820-845 kg/m$^3$; viscosity at 40° C. 2-4.5 mm$^2$/s) mixing the oily product in a 2 liters glass container with diameter of 13 cm, with magnetic stirrer (Teflon anchor, length 3 cm diameter 7 mm) for 5 min at 1200 rpm.

100 mg of Grafysorber® expanded graphite (apparent density=3.1 g/l, SSA=64 m$^2$/g, C:O ratio=290) are added to the aqueous sample contaminated as above. The sample is mixed with a magnetic stirrer for 5 min at 1350 rpm. At the end of the mixing, the graphite on which the diesel has been adsorbed has collected together and is positioned completely on the surface of the water.

950 ml of water treated as above are drawn from the bottom of the container by means of a 1 L glass syringe and metered into a 1 litre cylindrical glass bottle with Teflon-coated stopper (diameter 9.5 cm). The remaining 50 ml are then filtered by gravity with pleated extra-rapid filter paper inside a graduated glass cylinder which allows accurate quantification of how much water remains trapped in the adsorbent material (approximately 2 ml).

Sample Analysis: Measurement of the Concentration of Residual Contaminant (Diesel) in Water 50 ml of cyclohexane solvent (C100307 Sigma-Aldrich, Cyclohexane, Laboratory Reagent, ≥99.8%) are added to the 1000 ml of treated water. The bottle is agitated manually for 1 minute to aid extraction of the non-adsorbed diesel. Approximately 100 ml of deionized water are then added to the sample to completely fill the bottle. The 50 ml of solvent containing the extracted diesel are arranged in the neck of the bottle, due to the lower density of the solvent with respect to the water, forming a head which can be easily sampled by means of glass pipette. 30 ml of solvent are then sampled and analysed by means of the Eracheck instrument (Eralytics: http://eralytics.com/instruments/eracheck-oil-in-water-testing/), according to the ASTM D7678 method (Standard Test Method for Total Petroleum Hydrocarbons (TPH) in Water and Wastewater with Solvent Extraction using Mid-IR Laser Spectroscopy).

This method defines the procedure for determining the total petroleum hydrocarbons (TPH) in different aqueous samples, extractable with a cyclic aliphatic hydrocarbon (for example cyclohexane), and measurable by means of IR absorption in the range between 1370-1380 cm$^{-1}$ (7.25-7.30 μm). Unlike the gravimetric methods which require evaporation of the solvent prior to weighing, and the IR methods without solvent which require drying of the material in the solid phase prior to the measurement, the method used for this measurement also considers the volatile fraction of hydrocarbon. Compared to gaschromatographic methods, the method used for this measurement guarantees complete determination of the petroleum hydrocarbons present in the sample because also the hydrocarbons that do not fall within the elution window are identified. The method allows definition of the TPH parameter in aqueous samples for contamination values between 0.5 and 1000 mg/L.

Figure 1:
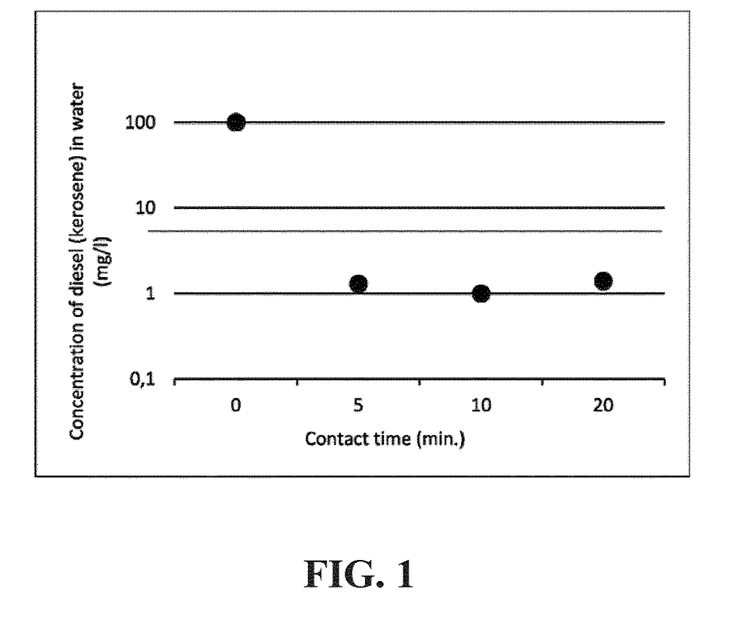
FIG. 1 is a logarithmic scale graph showing the hydrocarbon adsorption trend over time in the treatment of water containing hydrocarbons described in Example 1.

FIG. 1 is a logarithmic scale graph which shows the adsorption trend and reports the quantity of residual diesel after treatment with 100 mg of Grafysorber® (initial diesel concentration 100 mg/l=100 ppm) according to the contact time. The line indicates the limit of total hydrocarbons for discharge into surface water (5 mg/l) established by Italian law.

The graph shows abatement of the contaminating hydrocarbon from 100 mg/l to 1 mg/l in 5 minutes.

Figure 1A:
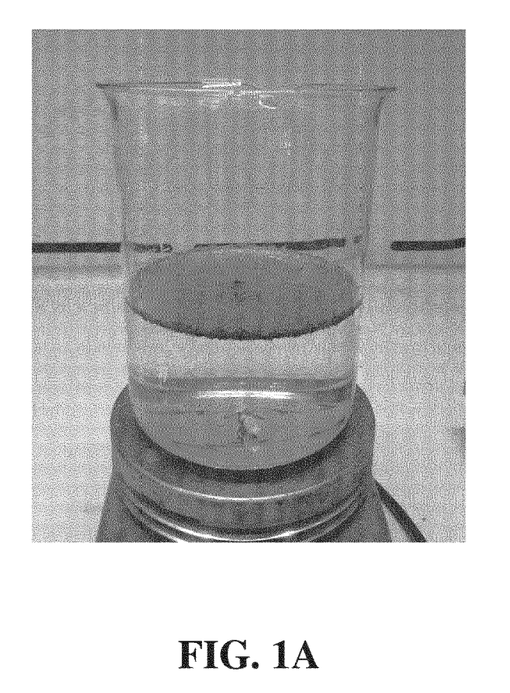
FIG. 1A is a photograph illustrating the separation between graphite and water in the treatment described in Example 1.

FIG. 1A is a photograph which shows the complete separation between graphite and water at the end of the treatment. This complete separation allows removal of the graphite by means of known techniques such as filtering, centrifuging and similar.

EXAMPLE 2

Treatment of Water Containing 100 ppm of Diesel Fuel with 25 mg/l of Expanded Graphite
Graphite: Hydrocarbon Weight Ratio 1:4

The procedure was as in Example 1 but using only 25 mg of Grafysorber® (apparent density=3.1 g/L, SSA=64 m$^2$/g, C:O ratio=290).

Figure 2:
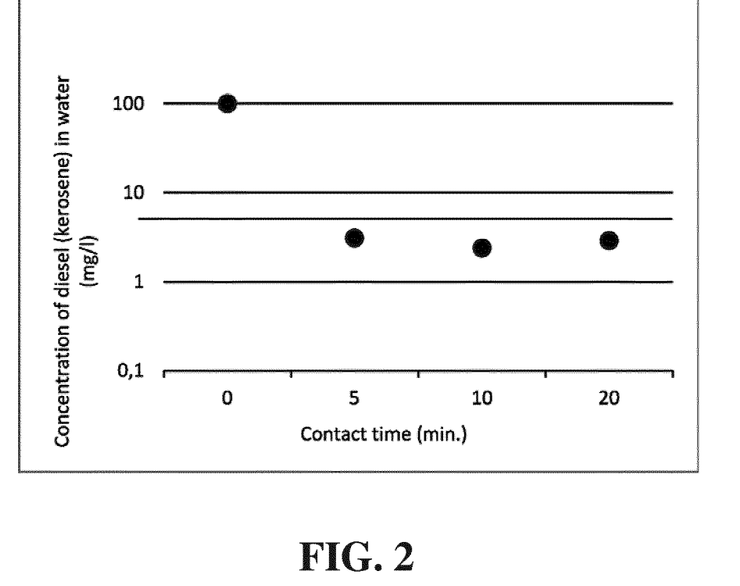
FIG. 2 is a logarithmic scale graph showing the hydrocarbon adsorption trend over time in the treatment of water containing hydrocarbons described in Example 2.

The graph of FIG. 2 is analogous to that of FIG. 1 and shows that the quantity of residual diesel after treatment has been brought from an initial concentration of 100 mg/l to a concentration of less than 5 mg/l in approximately 5 minutes, despite using a quantity of graphite of ¼ compared to the quantity of diesel.

EXAMPLE 3

Treatment of 100 ppm of Diesel with 10 mg/l of Expanded Graphite
Graphite:Hydrocarbon Weight Ratio 1:10

The procedure was the same as in Example 1 but using only 10 mg of Grafysorber® (apparent density=3.1 g/L, SSA=64 m$^2$/g, C:O ratio=290).

Figure 3:
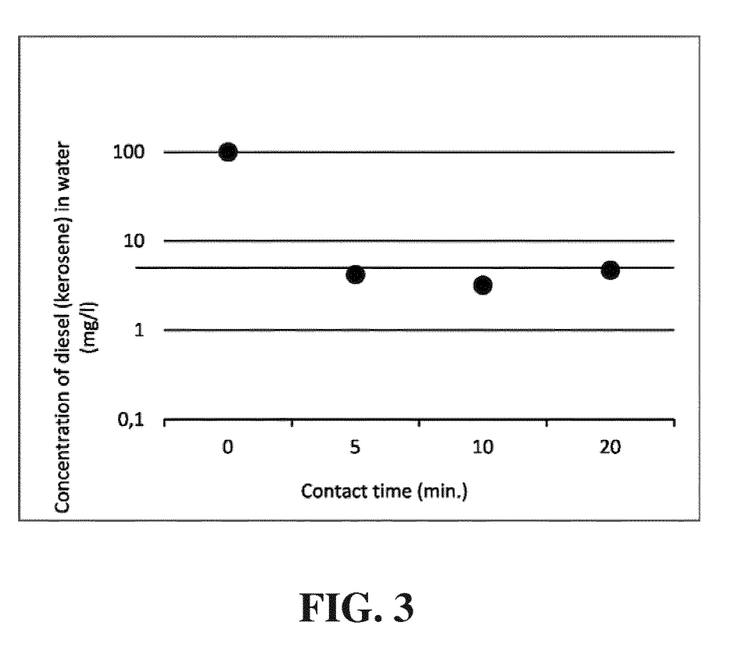
FIG. 3 is a logarithmic scale graph showing the hydrocarbon adsorption trend over time in the treatment of water containing hydrocarbons described in Example 3.

The graph of FIG. 3 is analogous to that FIG. 1 and shows that the quantity of residual diesel after treatment was brought from an initial concentration of 100 mg/l to a concentration of approximately 5 mg/l in approximately 5 minutes, despite using a quantity of graphite of ¹/₁₀ compared to the quantity of diesel.

EXAMPLE 4

Treatment of Water Containing 200 ppm of Diesel Fuel with 100 mg/l of Expanded Graphite Graphite:Hydrocarbon Weight Ratio 1:2

The procedure was as in Example 1 but treating water containing a double concentration of hydrocarbon (200 ppm) and using only 100 mg of Grafysorber® (apparent density=2.4 g/L, SSA=75 m$^2$/g, C:O ratio=245).

Figure 4:
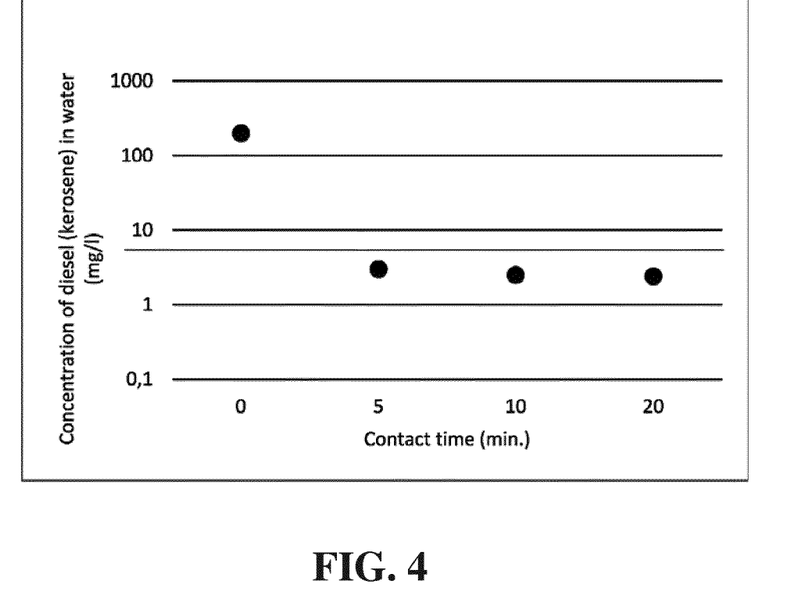
FIG. 4 is a logarithmic scale graph showing the hydrocarbon adsorption trend over time in the treatment of water containing hydrocarbons described in Example 4.

The graph of FIG. 4 is analogous to that of FIG. 1 and shows that the quantity of residual diesel after treatment was brought from an initial concentration of 200 mg/l to a concentration of 5 mg/l in approximately 5 minutes, despite using a quantity of graphite amounting to ½ compared to the quantity of diesel.

EXAMPLE 5

Treatment of Water Containing 50 ppm of Diesel Fuel with 100 mg/l of Expanded Graphite Graphite:Hydrocarbon Weight Ratio 2:1

The procedure was as in Example 1 but treating water containing half the concentration of hydrocarbon (50 ppm) and using the same quantity (100 mg) of Grafysorber® (apparent density=2.4 g/L, SSA=75 m$^2$/g, C:O ratio=245).

Figure 5:
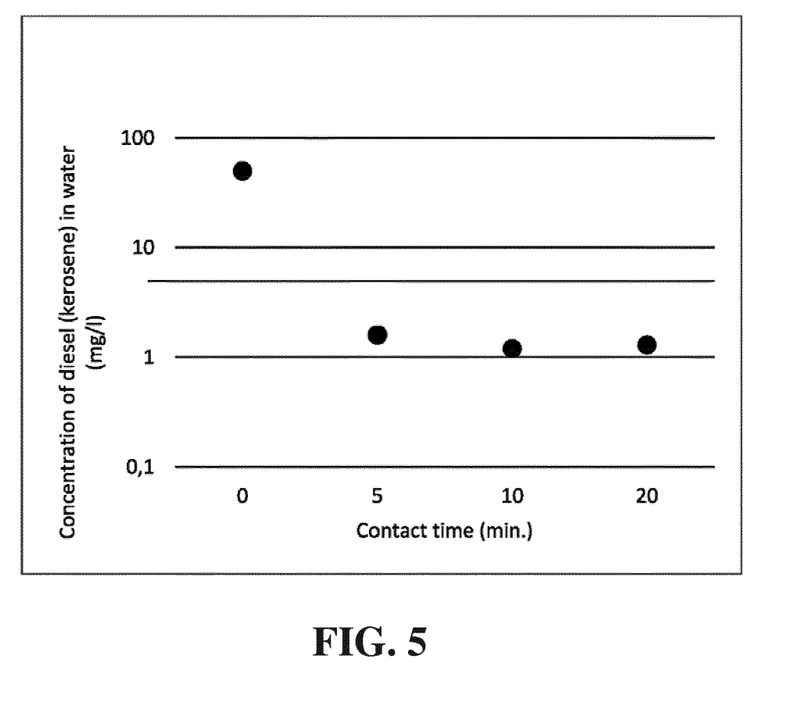
FIG. 5 is a logarithmic scale graph showing the hydrocarbon adsorption trend over time in the treatment of water containing hydrocarbons described in Example 5.

The graph of FIG. 5 is analogous to that of FIG. 1 and shows that the quantity of residual diesel after treatment was brought from an initial concentration of 50 mg/l to a concentration of approximately 1 mg/l in approximately 5 minutes.

EXAMPLE 6

Treatment of Water Containing 100 ppm of Kerosene with 100 mg/l of Expanded Graphite Graphite:Hydrocarbon Weight Ratio 1:1

The procedure was as in Example 1 but using 100 mg/l of kerosene (density at 15° C. 780-810 kg/m$^3$; viscosity at 40° C. 1-2.5 mm$^2$/s) and 100 mg of Grafysorber® (apparent density=3.9 g/L, SSA=62 m$^2$/g, C:O ratio=310).

Figure 6:
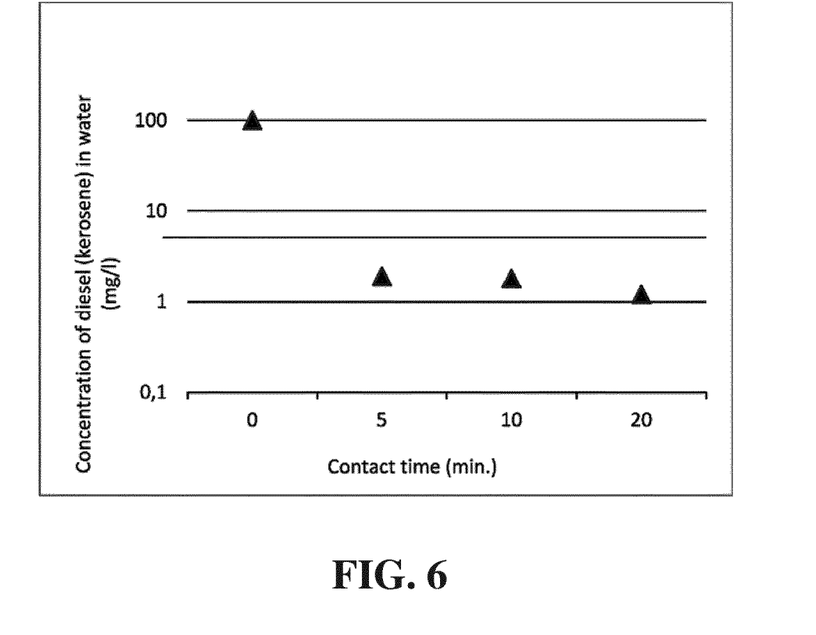
FIG. 6 is a logarithmic scale graph showing the hydrocarbon adsorption trend over time in the treatment of water containing hydrocarbons described in Example 6.

The graph of FIG. 6 is analogous to that of FIG. 1 and shows that the quantity of residual diesel after treatment was brought from an initial concentration of 100 mg/l to a concentration of less than 5 mg/l in approximately 5 minutes.

EXAMPLE 7

Treatment of Water Containing 100 ppm of Kerosene with 25 mg/l of Expanded Graphite Graphite:Hydrocarbon Weight Ratio 1:4

The procedure was as in Example 6, using 100 mg/l of kerosene (density at 15° C. 780-810 kg/m$^3$; viscosity at 40° C. 1-2.5 mm$^2$/s) but only 25 mg of Grafysorber® (apparent density=3.9 g/L, SSA=62 m$^2$/g, C:O ratio=310).

Figure 7:
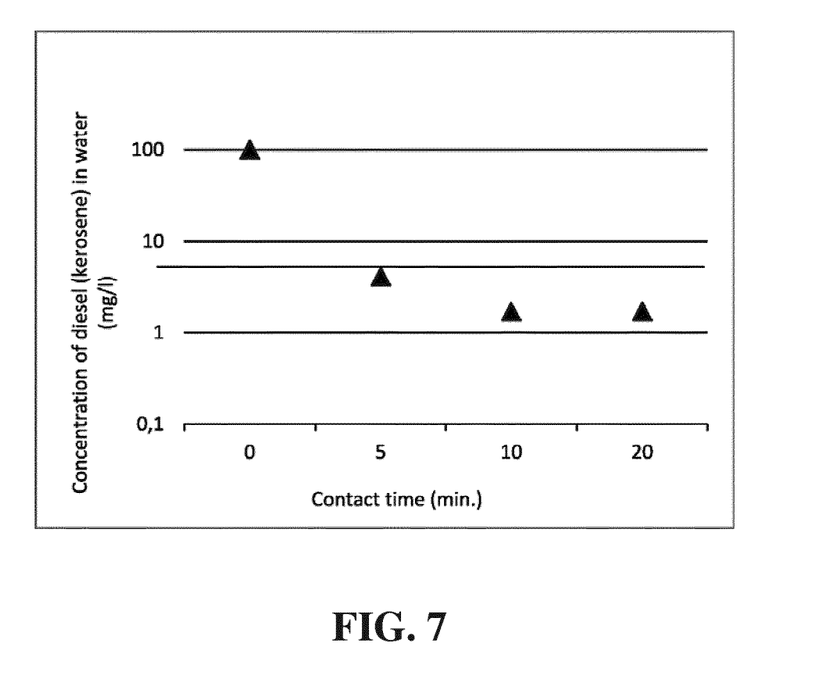
FIG. 7 is a logarithmic scale graph showing the hydrocarbon adsorption trend over time in the treatment of water containing hydrocarbons described in Example 7.

The graph of FIG. 7 is analogous to that of FIG. 6 and shows that the quantity of residual kerosene after treatment was brought from an initial concentration of 100 mg/l to a concentration of less than 5 mg/l in approximately 5 minutes.

EXAMPLE 8

Treatment of Water Containing 100 ppm of Kerosene with 10 mg/l of Expanded Graphite Graphite:Hydrocarbon Weight Ratio 1:10

The procedure was as in Example 6, using 100 mg/l of kerosene (density at 15° C. 780-810 kg/m$^3$; viscosity at 40° C. 1-2.5 mm$^2$/s) but only 10 mg of Grafysorber® (apparent density=3.9 g/L, SSA=62 m$^2$/g, C:O ratio=310).

Figure 8:
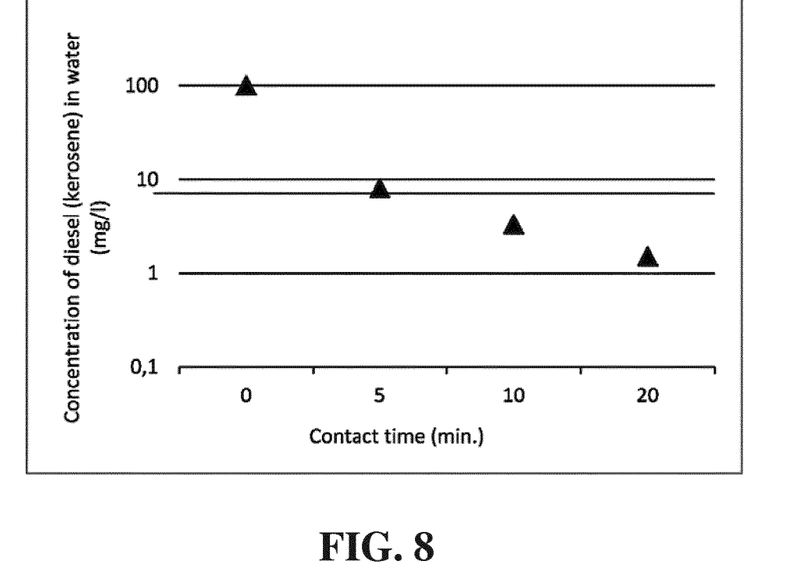
FIG. 8 is a logarithmic scale graph showing the hydrocarbon adsorption trend over time in the treatment of water containing hydrocarbons described in Example 8.

The graph of FIG. 8 is analogous to that of FIG. 6 and shows that the quantity of residual kerosene after treatment was brought from an initial concentration of 100 mg/l to a concentration of 5 mg/l in approximately 5 minutes, with subsequent reduction to approximately 1 g/l within 20 minutes.

EXAMPLE 9

Treatment of Water Containing 100 ppm of Synthetic Oil with 100 mg/l of Expanded Graphite Graphite:Hydrocarbon Weight Ratio 1:1

The procedure was as in Example 1 but treating water containing a concentration of 100 mg/l of Nytex 832 synthetic oil (density at 15° C. 925 kg/m$^3$; viscosity at 40° C. 226 mm$^2$/s) and using the same quantity (100 mg) of Grafysorber® (apparent density=3.9 g/L, SSA=62 m$^2$/g, C:O ratio=310).

Figure 9:
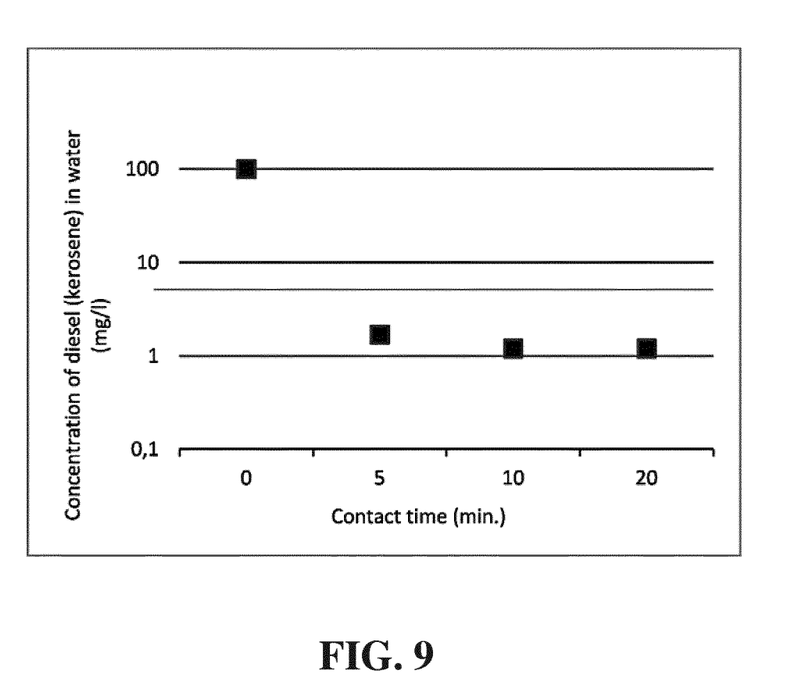
FIG. 9 is a logarithmic scale graph showing the hydrocarbon adsorption trend over time in the treatment of water containing hydrocarbons described in Example 9.

The graph of FIG. 9 is analogous to that of FIG. 1 and shows that the quantity of residual oil after treatment was brought from an initial concentration of 100 mg/l to a concentration of approximately 1 mg/l in approximately 5 minutes.

EXAMPLE 10 (Comparison)

Treatment of Water Containing 100 ppm of Diesel Fuel with 100 mg/l of Oxidised Expanded Graphite Graphite:Hydrocarbon Weight Ratio 1:1

The procedure was as in Example 1 but using the same quantity (100 mg) of an oxidised expanded graphite having the following characteristics: apparent density=3.8 g/L, SSA=400 m$^2$/g, C:O ratio=20).

Figure 10:
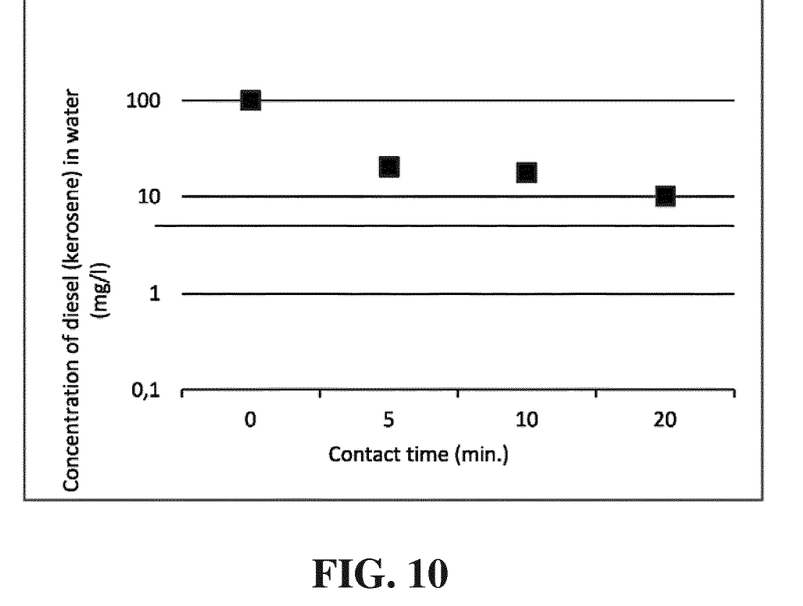
FIG. 10 is a logarithmic scale graph showing the hydrocarbon adsorption trend over time in the treatment of water containing hydrocarbons described in the comparison Example 10.

The graph of FIG. 10 is analogous to that of FIG. 1 and shows that the quantity of residual diesel after treatment for 5 minutes was brought from an initial concentration of 100 mg/l to a concentration of approximately 30 mg/l in approximately 5 minutes. Continuing the treatment up to 20 minutes, the diesel concentration did not drop below 10 mg/l. It was not possible to reduce the quantity of hydrocarbons below the limit of 5 mg/l established by Italian law.

Figure 10A:
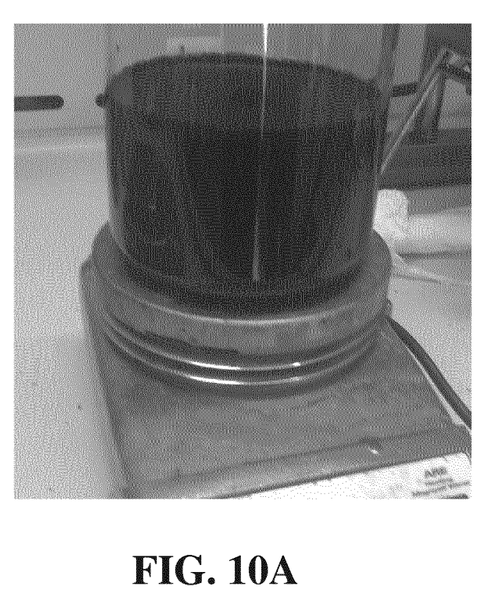
FIG. 10A is a photograph illustrating the absence of separation between graphite and water in the treatment described in the comparison Example 10.

FIG. 10A is a photograph that shows the absence of separation between water and expanded graphite. This made the separation between the solid phase and the liquid phase difficult and complex.

The above examples show that the use of non-oxidised expanded graphite, i.e. with a C:O ratio ≥100, is an essential characteristic for the process according to the invention.

EXAMPLE 11 (Comparison)

Treatment of Water Containing 100 ppm of Diesel Fuel with 100 mg/l of Oxidised Expanded Graphite Graphite:Hydrocarbon Weight Ratio 1:1

The procedure was as in Example 1 but reducing the speed of rotation from 1350 rpm to 600 rpm. The result is shown in the graph of FIG. 11.

Figure 11:
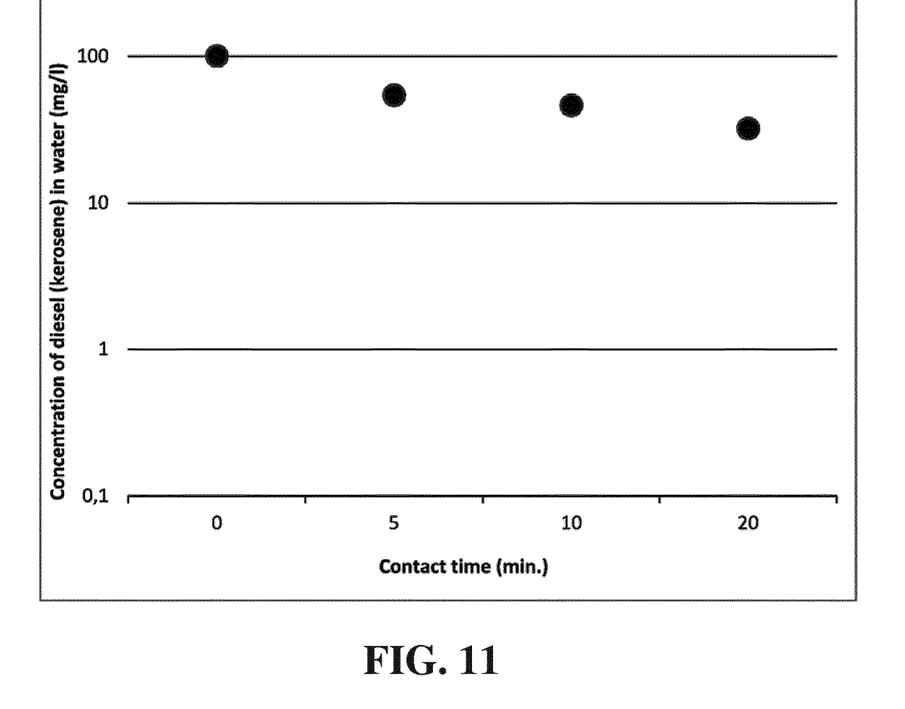
FIG. 11 is a logarithmic scale graph showing the hydrocarbon adsorption trend over time in the treatment of water containing hydrocarbons described in the comparison Example 11.

The graph of FIG. 11 is analogous to that of FIG. 1 and shows that a weaker stirring slows down the kinetic of absorption of the expanded graphite and prevents reaching the level of decontamination required by the current regulations. Even by continuing the treatment up to 20 minutes, the diesel fuel concentration did not drop below about 30 mg/l. Thus, it was not possible to reduce the quantity of hydrocarbons below the limit of 5 mg/l, as required by Italian law.

EXAMPLE 12

Treatment of Water Containing 600 ppm of Lubricating Oil with 3 g/l of Expanded Graphite
Graphite:Hydrocarbon Weight Ratio 5:1 Calculated on the Process Comprising all Cycles 150 liters of water contaminated by 600 ppm of lubricating oil for engine (density at 15° C.=855 kg/m$^3$, viscosity at 40° C.=87.5 mm$^2$/s) were introduced into a mixing tank 12 containing 3 g/l of expanded graphite Grafysorber® (450 g) (apparent density=3.1 g/l, SSA=64 m$^2$/g, ratio C:O=290). The contaminated liquid was mixed according to the following program: 5 min agitation and 5 min stop for a total of 40 min treatment. At the end of the treatment, 145 liters of water were filtered from any residues of adsorbed material and discharged into the treated water collection tank 30. A portion of treated water was subjected to analysis as indicated in Example 1, every 5 cycles of treatment.

The treatment was repeated for 60 cycles, always using the same recycled expanded graphite, adding the amount of contaminated water needed to reach a 150 L batch (i.e. 145 L). At the end of the 60th cycle the water had a concentration of 4.9 ppm. This value represented the limit of the treatment to clean the contaminated water, and indicated the need to replace the expanded graphite Grafysorber® with new expanded graphite. Exhausted Grafysorber® was squeezed to recover the adsorbed oil and then disposed of by incineration.

Figure 12:
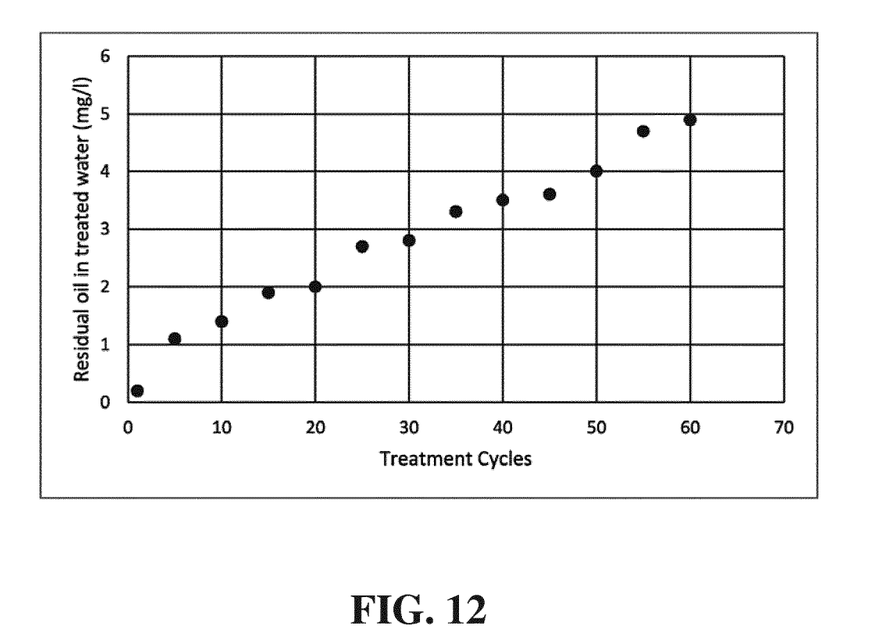
FIG. 12 is a graph showing the residual hydrocarbon content in a process comprising a series of cycles as described in the Example 12.

FIG. 12 shows the content of residual oil in the re-used graphite against the number of treatment cycles.

EXAMPLE 13

Treatment of a Water Emulsion Containing 450 ppm of Lubricating Oil with 25 mg/l of Expanded Graphite
Graphite: Hydrocarbon Weight Ratio 1:18
The procedure was as in Example 2 but by treating a water containing a hydrocarbon concentration of 450 ppm and employing the same amount of Grafysorber® (apparent density=4.0 g/L, SSA=63 m$^2$/g, C:O ratio=299).

Figure 13:
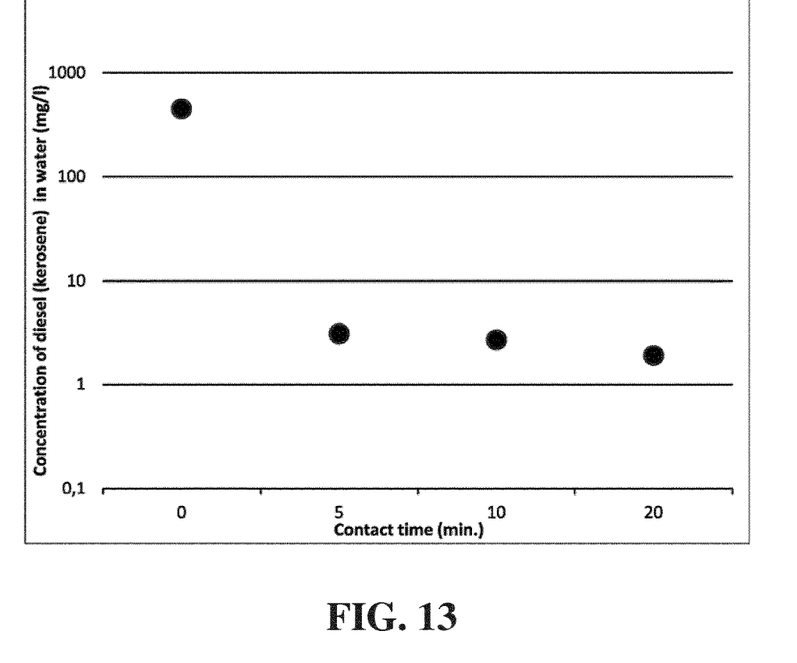
FIG. 13 is a logarithmic scale graph showing the hydrocarbon adsorption trend over time in the treatment of water containing hydrocarbons described in Example 13.

The graph of FIG. 13 shows that the amount of residual oil after treatment was brought from an initial concentration of 450 ppm to a concentration of about 3 ppm in about 5 min.

EXAMPLE 14

Treatment of a Water Emulsion Containing 750 ppm of Lubricating Oil with 25 mg/l of Expanded Graphite
Graphite: Hydrocarbon Weight Ratio 1:30
The procedure was as in Example 2, but by treating a water containing 750 ppm of hydrocarbons with the same amount of Grafysorber® (apparent density=4.1 g/L, SSA=57 m$^2$/g, ratio C:O=297).

Figure 14:
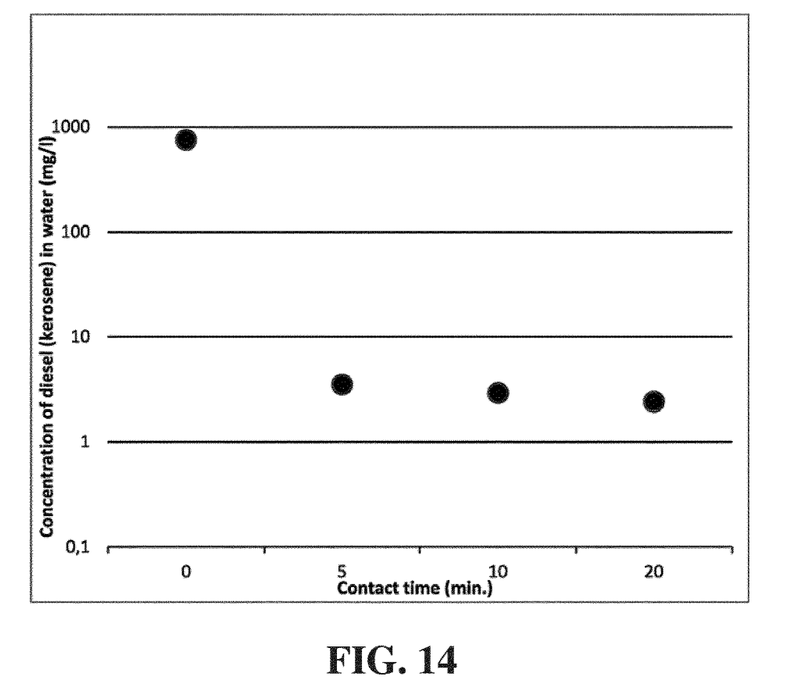
FIG. 14 is a logarithmic scale graph showing the hydrocarbon adsorption trend over time in the treatment of water containing hydrocarbons described in Example 14.

The graph of FIG. 14 shows that the amount of residual oil after treatment was brought from an initial concentration of 750 ppm at a final concentration of about 3 ppm in about 5 min.

The invention claimed is:

1. A process for treating water containing hydrocarbons comprising the following steps:
    a) combining expanded graphite and water containing hydrocarbons in a vessel,
        the hydrocarbons present in the water in an amount less than or equal to 1 g/l,
        the expanded graphite having a density from 2 g/l to less than 5 g/l, a specific surface area from 50 m$^2$/g to 100 m$^2$/g, and a carbon:oxygen ratio (C:O) greater than or equal to 100, and
        the expanded graphite having a weight ratio of up to 1:30 with the hydrocarbons;
    b) mixing the expanded graphite and the water containing the hydrocarbons with a stirrer rotating at a speed of more than 800 rpm in the vessel to adsorb a portion of the hydrocarbons by the expanded graphite;
    c) allowing the expanded graphite containing the adsorbed hydrocarbons to form a layer on the top of the water, the water containing residues of expanded graphite; and
    d) discharging the water containing the residues of expanded graphite from the vessel by withdrawing the water containing the residues of the expanded graphite from a zone below the layer of expanded graphite containing the adsorbed hydrocarbons and passing the water containing the residues of the expanded graphite through a filtering system, whereby the residues of expanded graphite are removed from the water.

2. The process according to claim 1 wherein step b) comprises mixing the expanded graphite and the water containing the hydrocarbons with the stirrer rotating at a speed of more than 1000 rpm.

3. The process according to claim 1 wherein the expanded graphite has a specific surface area from 60 m$^2$/g to 80 m$^2$/g, and a carbon:oxygen ratio (C:O) greater than or equal to 200.

4. The process according to claim 1 wherein the expanded graphite is used in a weight ratio of up to 1:20 to the hydrocarbons.

5. The process according to claim 1 wherein the mixing of step b) is carried out for a time of less than 30 minutes.

6. The process according to claim 5 wherein the mixing of step b) is carried out for a time of less than 20 minutes.

7. The process according to claim 6 wherein the mixing of step b) is carried out for a time of less than 10 minutes.

8. The process according to claim 1 wherein the hydrocarbons in the water in step a) are present in an amount equal to or less than 0.5 g/l.

9. The process according to claim 1 wherein treating the water containing the hydrocarbons occurs at ambient temperature.

10. The process according to claim 1 wherein the filtering system of step d) is located at a bottom of the vessel and the discharging of the water containing the residues of the expanded graphite is carried out by a pump located outside of the vessel and downstream of the filtering system.

11. The process according to claim 1 wherein the filtering system of step d) is located outside of the vessel, and the discharging of the water containing the residues of the expanded graphite is carried out by a pump located outside of the vessel and upstream of the filtering system.

12. The process according to claim 1 further comprising using the layer of expanded graphite containing the absorbed hydrocarbons from step d) to repeat steps a), b), c), and d) to treat new contaminated water.

\* \* \* \* \*